Figure 1:
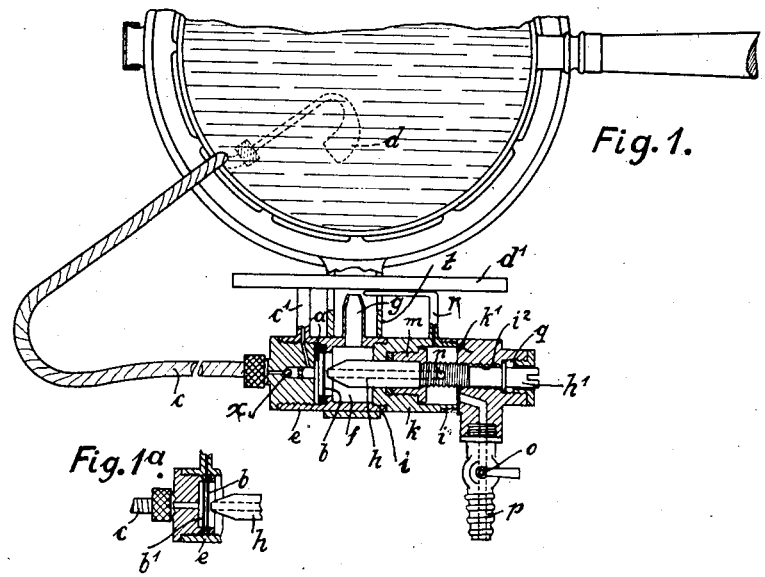

Aug. 20, 1929.  G. B. M. KELP  1,725,006
TEMPERATURE CONTROL DEVICE
Filed Oct. 2, 1928

Fig. 1ª.

Inventor
G. B. M. Kelp

Patented Aug. 20, 1929.

1,725,006

UNITED STATES PATENT OFFICE.

GUSTAV BENNO MORITZ KELP, OF HAMBURG, GERMANY.

TEMPERATURE-CONTROL DEVICE.

Application filed October 2, 1928, Serial No. 309,832, and in Germany September 9, 1927.

Devices for controlling apparatus or contrivances, for instance cooking apparatus heated by gas-burners, and the temperature of which is to be held at a prescribed height are known in which by the aid of a thermostat consisting of an elastic diaphragm subjected to the action of an expansible gaseous or liquid fluid the feed of the gas is cut off or reduced. In such constructions the diaphragm on one side acts as a valve to control a member, for instance the mouth or opening of one part of the gas conduit, to allow the necessary amount of gas to pass to the burner. On the other side the diaphragm is subjected to the action of an expansive gaseous or liquid fluid confined in a chamber, formed by way of example by a pipe or hose closed at the other end and exposed to the temperature of the vessel, the heating of which is to be regulated, the end of the closed expansible fluid conduit being thrust by way of example, into a boiling kettle, in such manner that when the desired temperature is reached, that is to say, in the present instance when the water is boiling, the feed of the gas is cut off and the flame of the burner extinguished or suitably reduced.

The object of the present invention is to construct devices of this kind in such manner that it is not only used for cutting off the feed of gas when the water is boiling, but also for controlling the temperature where it is desired to maintain the temperature constant at any predetermined level. With this object in view, according to the present invention, the diaphragm operating together with a member for securing the automatic regulation is also provided with means for adjusting the operation of the diaphragm by hand.

The invention while illustrated in connection with a gas heated vessel, is of wide application, and may be applied to any analogous temperature regulating use.

In making use of the new apparatus with gas- or vapour-burners for cutting off the feed of gas the member with which the diaphragm of the thermostat assumes a valve relationship consists of a tube forming part of the gas conduit, or interposed in the gas conduit, which tube is made adjustable. Should it be so desired the chamber which surrounds the expansible fluid acting on the diaphragm may communicate with the free ends of two pipes, of which one, as heretofore, is connected with the vessel to be temperature controlled and the other with the mixing tube of the burner, so that, when on the flame flashing back the burner becomes hot, and the chamber will be heated to such an extent that the diaphragm causes the cutting off of the fuel. The burner moreover may be connected with an ignition device which on the thermostat cooling down and the valve on the burner head thus opening automatically ignites the air-fuel-mixture rushing out.

In the drawing Fig. 1 illustrates the apparatus for a gas-burner in longitudinal section connected with a cooking apparatus, the latter being shown in plan.

Fig. 1ª shows a modification also in section.

Figure 2:
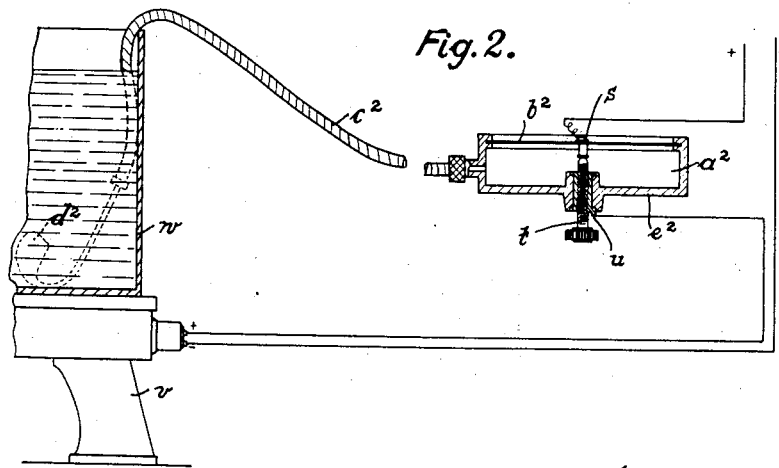

Fig. 2 shows a device applicable for an electric heating apparatus.

In the apparatus shown in Fig. 1 the thermostat consists of a chamber $a$, a diaphragm $b$ and a pipe $c$, which communicates with the chamber $a$ and preferably consists of a metal spiral hose or pipe communicating with a small closed vessel $d$ which may be termed a feeler. This feeler will be positioned into the space to be temperature controlled, for instance a cooking pot.

The casing $e$ of the chamber $a$ is provided with a second chamber $f$, from which the nozzle pipe $g$ branches off and in which chamber the gas tube $h$ opens out with its mouth at a slight distance from the diaphragm $b$.

In the construction shown in Fig. 1 the casing $e$ is connected with a second casing $k$, for instance by a screw connection $i$, and in the partition wall between the chamber $f$ and the casing $k$ the tube $h$ is adapted to slide, the tube $h$ passing the stuffing box $m$. In the construction shown the tube $h$ is formed by a rod, into which a longitudinal perforation is bored having also a lateral opening $n$ communicating with the casing $k$. In the construction shown the casing $k$ is sectional, the two sections being connected with one another by a screw thread $i'$. Into the section $k'$ of the casing $k$ the gas pipe $p$ opens, the same being provided with a cock $o$. The rod-like portion $h'$ of the tube $h$ is provided with an outer thread, which fits to an inner thread $i^2$ in the end wall of the casing section $k'$. A stuffing box arranged on the outer side of this wall serves for tightening up the rod $h'$. The rod projects outwardly and may be rotated by the aid of a screw driver or the like to adjust the mouth of the pipe $h$ forming together with the diaphragm $b$ a valve. By the screw thread $i^2$ on the end wall of the casing section $k'$ the mouth of the tube $h$ will be brought nearer to or at a greater distance from the diaphragm $b$. Thus one may adjust the thermostat so as to change the temperature level at which the diaphragm functions to control the temperature. In carrying out the invention it has been found that the temperature at which the vessel is to be maintained, may be controlled, to the fraction of a degree.

In the construction shown in Fig. 1 the chamber $a$ may communicate with a second pipe $c'$, which also ends in a vessel $d'$, which communicates with the chamber $a$ and forms a second feeler. However, this pipe $c'$ and the feeler $d'$ may be omitted. If it is made use of the feeler $d'$ projects into mixing pipe $t$ of the gas burner, and has the effect of being heated, when a flashing back of the flame occurs. The gaseous or liquid fluid in the feeler $d'$ will thereby be strongly heated to enable the mouth of the pipe $h$ to be closed by the diaphragm $b$ under this abnormal circumstance, so that the gas will be cut off and the flame extinguished. A pilot nozzle comprising a small pipe $r$ branching off from the chamber of the casing $k$, $k'$ and led into the burner may be used for automatically igniting the mixture of fuel and air when on the thermostat cooling down the valve again opens.

If it be found that the fluid entering from the feeler $d'$ and the pipe $c'$ into the chamber is not sufficient to bend out the diaphragm to close the pipe $h$ on account of the fact that the fluid enters the pipe $c$ and the feeler $d$ so as to diminish the power of the fluid entering the chamber by the pipe $c'$ a non-return valve $x$ may be arranged in the conduit communicating with the pipe $c$. A similar non-return valve in the conduit of the pipe $c'$ may not be necessary on account of the fact, that the space within the feeler $d'$ and the pipe $c'$ is comparatively small with respect to the pipe $c$ and the feeler $d$.

Another way of preventing the expansion of the fluid in the pipe $c'$ and the feeler $d'$ being dissipated in the pipe $c$ and the feeler $d$ is shown in Fig. 1ᵃ, in which two diaphragms $b$ and $b'$ are mounted, between which the pipe $c'$ opens out, and which have the effect of closing the conduit of the pipe $c$ when fluid enters between the diaphragms from the pipe $c'$ to force the diaphragm $b$ against the mouth of the pipe $h$.

In Fig. 2 an apparatus is shown for making use of the invention in connection with electric heating appliances. The diaphragm $b^2$ of the thermostat $b^2$, $c^2$, $d^2$ is here connected with one pole $s$ of an electric conductor. In this case the diaphragm may be made of metal or may be provided with a metal stud forming the pole $s$. Opposite the pole $s$ an adjusting screw $t$ forming the second pole of the conductor is mounted in the wall $e^2$ of the casing $a^2$. This screw $t$ is connected at $u$ with the electric conductor for giving current to the electric heater $v$. When the heat within the pot $w$ exceeds the predetermined temperature, that is generally, but not necessarily, boiling temperature, the heated fluid within the feeler $d^2$ and the tube $c^2$ and finally the chamber $a^2$ will expand to bulge out the diaphragm $b^2$ to separate the pole $s$ from the screw $t$, thus interrupting the electric current. By adjusting the screw $t$ the temperature at which the apparatus works can be nicely regulated.

I claim:—

1. A thermostatic temperature controlled device for heated apparatus comprising a thermostat having a diaphragm responsive to the action of an expansible fluid, and, temperature control means operating in conjunction with said diaphragm and adapted to be associated with the heating means for heating the said apparatus, the said temperature control means comprising a tube communicating with the gas conduit for supplying gas to the gas nozzle of the heating means and having an open end adjacent the said diaphragm and with which end of the tube the diaphragm coacts as a valve for controlling the flow of gas to the gas nozzle, means for adjusting said tube with respect to said diaphragm, and two pipes closed at their outer ends and communicating at their inner ends with the space at that side of the diaphragm opposite the said tube, one of said pipes being positioned with its closed end in the apparatus to be heated and the other pipe being positioned in the air mixing chamber of the burner whereby to be heated in the event of back flash of the burner flame.

2. A thermostatic temperature controlled device for heated apparatus comprising a thermostat having a diaphragm responsive to the action of an expansible fluid, temperature control means operating in conjunction with said diaphragm and adapted to be associated with the heating means for heating the said apparatus, the said temperature control means comprising a tube communicating with the gas conduit for supplying gas to the gas nozzle of the heating means and having an open end adjacent the said diaphragm and with which end of the tube the diaphragm coacts as a valve for controlling the flow of gas to the gas nozzle, means for adjusting said tube with respect to said diaphragm, and two pipes closed at their outer ends and communicating at their inner ends with the space at that side of the diaphragm opposite the said tube, one of said pipes being positioned with its closed end in the apparatus to be heated and the other pipe being positioned in the air mixing chamber of the burner whereby to be heated in the event of back flash of the burner flame, and a pilot burner communicating with said gas conduit at a point to be active regardless of the action of the thermostat.

3. A thermostatic temperature controlled device for heated apparatus comprising a thermostat having a diaphragm responsive to the action of an expansible fluid, temperature control means operating in conjunction with said diaphragm and adapted to be associated with the heating means for heating the said apparatus, the said temperature control means comprising a tube communicating with the gas conduit for supplying gas to the gas nozzle of the heating means and having an open end adjacent to the said diaphragm and with which end of the tube the diaphragm coacts as a valve for controlling the flow of gas to the gas nozzle, means for adjusting said tube with respect to said diaphragm, and two pipes closed at their outer ends and communicating at their inner ends with the space at that side of the diaphragm opposite the said tube, one of said pipes being positioned with its closed end in the apparatus to be heated and the other pipe being positioned in the air mixing chamber of the burner whereby to be heated in the event of back flash of the burner flame, and a check valve arranged between said pipes and operating automatically to assume its closed position when the second mentioned pipe is in operation.

In testimony whereof I have signed my name to this specification.

GUSTAV BENNO MORITZ KELP.